United States Patent [19]

Norling

[11] Patent Number: 4,697,455
[45] Date of Patent: Oct. 6, 1987

[54] ACCELEROMETER COIL MOUNTING SYSTEM

[75] Inventor: Brian L. Norling, Mill Creek, Wash.

[73] Assignee: Sundstrand Data Control, Inc., Redmond, Wash.

[21] Appl. No.: 853,153

[22] Filed: Apr. 16, 1986

[51] Int. Cl.[4] .............................................. G01P 15/13
[52] U.S. Cl. ..................................... 73/497; 73/517 B
[58] Field of Search ...................... 73/497, 517 B, 651, 73/862.61; 310/25, 27

[56] References Cited

U.S. PATENT DOCUMENTS 4,182,187  1/1980  Hanson .............................. 73/517 B
4,498,342  2/1985  Aske .................................. 73/517 B Primary Examiner—John Chapman
Attorney, Agent, or Firm—Christensen, O'Connor, Johnson & Kindness

[57] ABSTRACT

An accelerometer comprising a proof mass assembly that includes a reed suspended from a support and a cylindrical coil mounted to the reed by a mounting system that minimizes errors due to thermal stress. The mounting system comprises at least three mounting elements. Each mounting element has first and second ends, and a resilient intermediate portion. The first end of each mounting element is connected to the coil, the second end of each mounting element is connected to the reed, and the intermediate portion of each mounting element provides a low resistance to relative movement between the coil and reed in a radial direction, and a high resistance to relative movement between the coil and reed in directions normal to the radial direction. The reed preferably comprises fused quartz, and the mounting system preferably comprises a fused quartz base mounted directly to the reed and connected to the second end of each mounting element. The coil may be mounted on a coil form that is connected directly to the first end of each mounting element.

9 Claims, 9 Drawing Figures

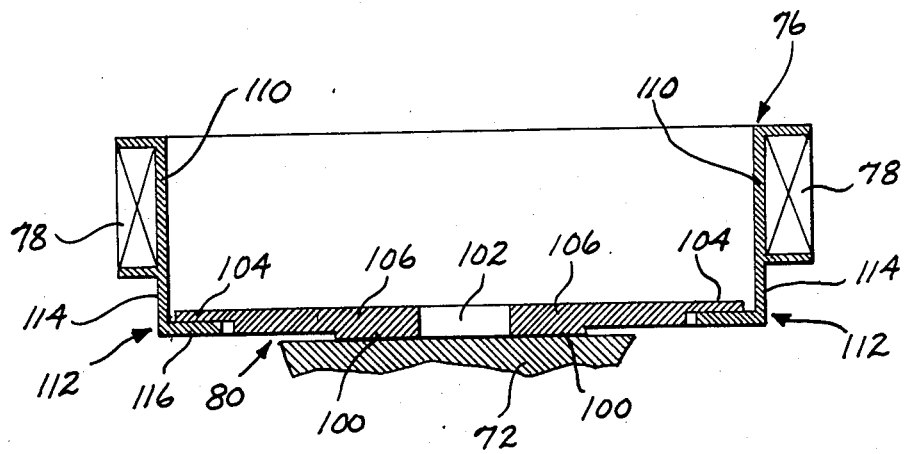
Fig. 4.
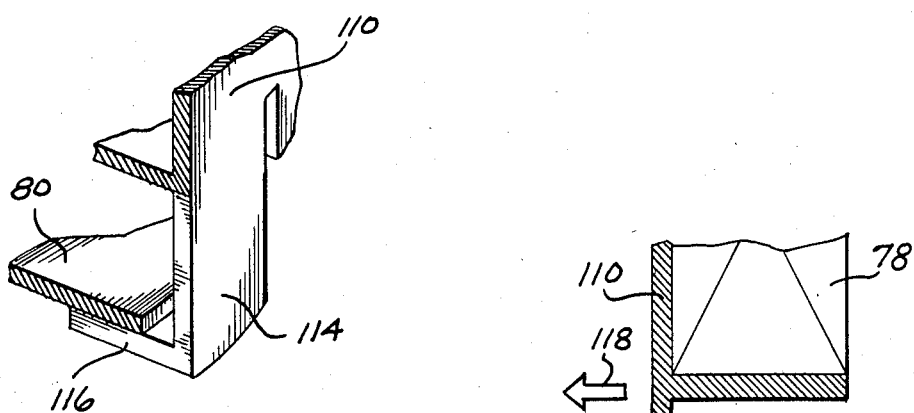
Fig. 5.
Fig. 6.

ACCELEROMETER COIL MOUNTING SYSTEM

LICENSE RIGHTS

This invention was made with government support under Contract No. F33615-85-C-1741, awarded by the U.S. Air Force. The government has certain rights in this invention.

FIELD OF THE INVENTION

The present invention relates to accelerometers, and in particular to servoed accelerometers that use force restoring coils to maintain a mass at a null position.

BACKGROUND OF THE INVENTION

An example of a prior art accelerometer design with high performance potential is described in U.S. Pat. No. 3,702,073. The accelerometer described therein is comprised of three primary components, namely, a proof mass assembly and upper and lower stators or magnetic circuits between which the proof mass assembly is supported. The proof mass assembly includes a movable reed that is suspended via flexure elements to an outer annular support ring. The reed and support ring are commonly provided as a unitary structure composed of fuzed quartz.

Both upper and lower surfaces of the reed include capacitor plates and force restoring coils. Each force restoring coil is positioned on the reed such that the central axis of the coil coincides with a line that extends through the center of the reed and that is normal to the top and bottom surfaces of the reed. This line is coincident with the sensitive axis of the accelerometer. A plurality of mounting pads are formed at spaced apart positions around the upper and lower surfaces of the annular support ring. These mounting pads mate with inwardly facing surfaces of the upper and lower stators when the accelerometer is assembled.

Each stator is generally cylindrical, and has a bore provided in its inwardly facing surface. Contained within the bore is a permanent magnet. The bore and permanent magnet are configured such that an associated one of the force restoring coils of the proof mass assembly fits within the bore, with the permanent magnet being positioned within the cylindrical core of the force restoring coil. Current flowing through the coil therefore produces a magnetic field that interacts with the permanent magnet to produce a force on the reed. Also provided on the inwardly facing surfaces of the stators are capacitor plates configured to form capacitors with the upper and lower capacitor plates on the reed. Thus movement of the reed with respect to the upper and lower stators results in a differential capacitance change.

In operation, the accelerometer is affixed to an object whose acceleration is to be measured. Acceleration of the object along the sensitive axis results in pendulous, rotational displacement of the reed and coils with respect to the support ring and the stators. The resulting differential capacitance change caused by this displacement is sensed by a suitable feedback circuit. The feedback circuit produces a current that, when applied to the force restoring coils, tends to return the reed to its neutral position. The magnitude of the current required to maintain the reed in its neutral position is directly related to the acceleration along the sensitive axis.

An important characteristic of an accelerometer of the type described above is its immunity to errors due to thermal stress. Thermal stress results from the fact that different parts of the accelerometer are composed of materials that have different coefficients of thermal expansion. For example if the reed is composed of fused quartz, and if the coils are mounted on metal coil forms that in turn are mounted on the reed, temperature change will result in stress at the reed/coil form interfaces that can cause reed deformation and result in errors in the accelerometer output. Deformations are canceled to a large extent by the symmetry of the opposing coil, but small errors may still result.

SUMMARY OF THE INVENTION

The present invention provides an accelerometer in which errors due to thermal stresses at the coil/reed interface are minimized. The accelerometer comprises a proof mass assembly that includes a reed suspended from a support for movement with respect thereto. A coil is mounted to the reed by a mounting system that comprises at least three mounting means. Each mounting means has first and second ends and a resilient intermediate portion. The first end of each mounting means is connected to the coil, the second end of each mounting means is connected to the reed, and the intermediate portion of each mounting means provides a low resistance to relative movement between the coil and reed in a radial direction and a high resistance to relative movement between the coil and reed in directions normal to the radial direction. In a preferred embodiment, the reed comprises fused quartz, and the mounting system comprises a fused quartz base mounted directly to the reed. In this embodiment, the second end of each mounting means is directly connected to the base. The coil may be mounted on a coil form that is connected directly to the first end of each mounting means.

BRIEF DESCRIPTION OF THE DRAWINGS

FIG. 4 is a cross-sectional view taken along the lines 4—4 of FIG. 3;

FIG. 5 is a perspective view showing one of the legs;

FIG. 6 is a partial cross-sectional view showing bending of one of the beams;

DETAILED DESCRIPTION OF THE INVENTION

Figure 1:
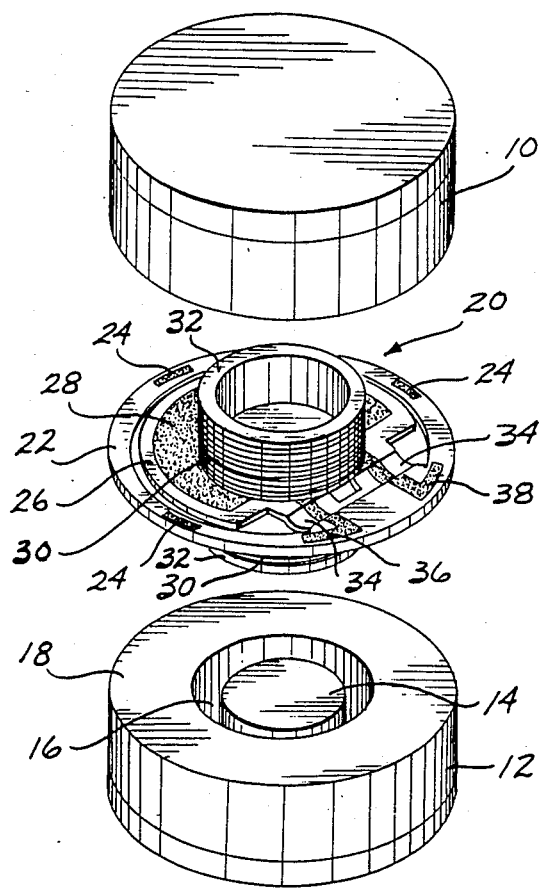
FIG. 1 is an exploded perspective view of a prior art accelerometer.

FIG. 1 illustrates an example of a force balancing accelerometer known in the prior art. This accelerometer includes an upper stator 10 and a lower stator 12. The inwardly facing surface of each stator includes a bore within which is positioned a permanent magnet capped by a pole piece, as illustrated by pole piece 14 within bore 16 of surface 18. Also shown in FIG. 1 is proof mass assembly 20 that is mounted between the upper and lower stators. Proof mass assembly 20 comprises outer annular support ring 22 and reed 26 supported from the support ring by flexures 34. The reed, flexures and support ring are preferably fabricated from a single piece of fused quartz. Support ring 22 includes three mounting pads 24 on its upper surface, and a similar set of three mounting pads (not shown) on its lower surface. When the accelerometer is assembled, mounting pads 24 contact the upper and lower stators, and provide support for the proof mass assembly.

Capacitor plate 28 is deposited on the upper surface of reed 26, and a similar capacitor plate (not shown) is deposited on the lower surface of reed 26. The pick-off plates cooperate with the inwardly facing surfaces of upper and lower stators 10 and 12 to provide a capacitive pick-off system. Also mounted on either side of reed 26 are coil forms 32 on which coils 30 are mounted. As is well understood in the servoed instrument art, coils 30 cooperate with the permanent magnets in the stators and with a suitable feedback circuit to retain reed 26 at a predetermined position with respect to support ring 22. Thin film pick-off leads 36 and 38, and similar leads (not shown) on the lower surface of proof mass assembly 20, provide electrical connections to the capacitor pick-off plates and force restoring coils.

In the design of an accelerometer of the type shown in FIG. 1, it is nearly impossible to use the same material for all of the different components. For example, reed 26 is preferably composed of fused quartz, coil 30 is preferably composed of a conductive, nonmagnetic material such as copper, and coil form 32 is preferably made from a nonmagnetic material such as aluminum. As a result, there will invariably be mismatches in the coefficients of thermal expansion of adjacent components. Such mismatches can deform the components and cause errors in a number of different ways, depending on the type of suspension and displacement pick-off method used. In the accelerometer of FIG. 1, the coil forms are typically mounted directly to the reed with a compliant elastomer. The mismatch in thermal coefficient between aluminum and fused quartz is large, and the compliant elastomer layer does not relieve all of the stress at this interface. The remaining stresses, which are not cancelled out by the symmetry of the opposing coil, can deform the capacitor pick-off plates or the flexures. Either of these deformations can cause a bias in the accelerometer output. In addition, distortions which change the position of the coil windings can cause scale factor errors.

Figure 2:
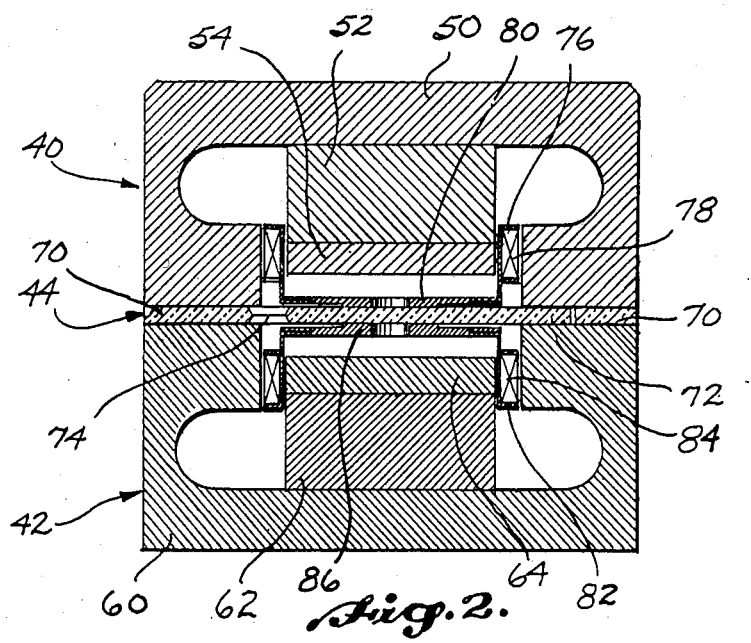
FIG. 2 is a cross-sectional view of an accelerometer according to the present invention.

FIGS. 2-6 illustrate a preferred embodiment of the accelerometer of the present invention. In this accelerometer, stresses due to differential thermal expansion between the reed and the coils and coil forms are significantly reduced. Referring initially to FIG. 2, the accelerometer includes upper stator 40 and lower stator 42 between which proof mass assembly 44 is sandwiched. Upper stator 40 comprises Invar alloy excitation ring 50, magnet 52 and pole piece 54, and lower stator 42 similarly comprises Invar alloy excitation ring 60, magnet 62 and pole piece 64. Proof mass assembly 44 includes annular support ring 70 and reed 72 joined by flexures 74 (only one flexure shown in the cross section of FIG. 2). Coil form 76 is centrally mounted on the upper surface of reed 72 by base 80, and contains coil 78 wound thereon. Similarly, coil form 82 that includes coil 84 is mounted on the lower surface of reed 72 by base 86, in alignment with coil form 76. Each coil occupies a comparatively narrow gap between its respective pole piece and its respective excitation ring, to provide the force balancing function well known to those skilled in the art. The stators 40 and 42 and reed 72 may include conventional capacitive pick-off elements coupled to a suitable pick-off circuit for detecting movement of the reed.

FIGS. 3-6 illustrate further details of coil form 76 and coil 78, and in particular illustrate the technique whereby these elements are mounted to reed 72 in a manner that reduces errors due to thermal stress. The coil form is mounted to the reed by base 80 that comprises a disk-like member that includes downwardly projecting, annular mounting pad 100, central opening 102, lip 104, and intermediate section 106. The upper surface of base 80 is planar, whereas the lower surface is stepped as shown in FIG. 4, such that mounting pad 100 projects below the level of intermediate section 106, and such that the bottom surface of lip 104 is higher than that of intermediate section 106.

Coil form 76 comprises three-sided, outwardly facing annular bracket 110 in which coil 78 is positioned, and a plurality of legs 112 that extend downward from bracket 110. In the illustrated embodiment, there are a total of 18 of such legs. Each leg 112 includes downwardly extending beam 114, and foot 116 that extends inwardly from beam 114 under lip 104 of base 80. Each foot 116 is bonded to lip 104 by a suitable elastomer. Pad 100 of base 80 is also bonded to reed 72 by a suitable elastomer.

Figure 3:
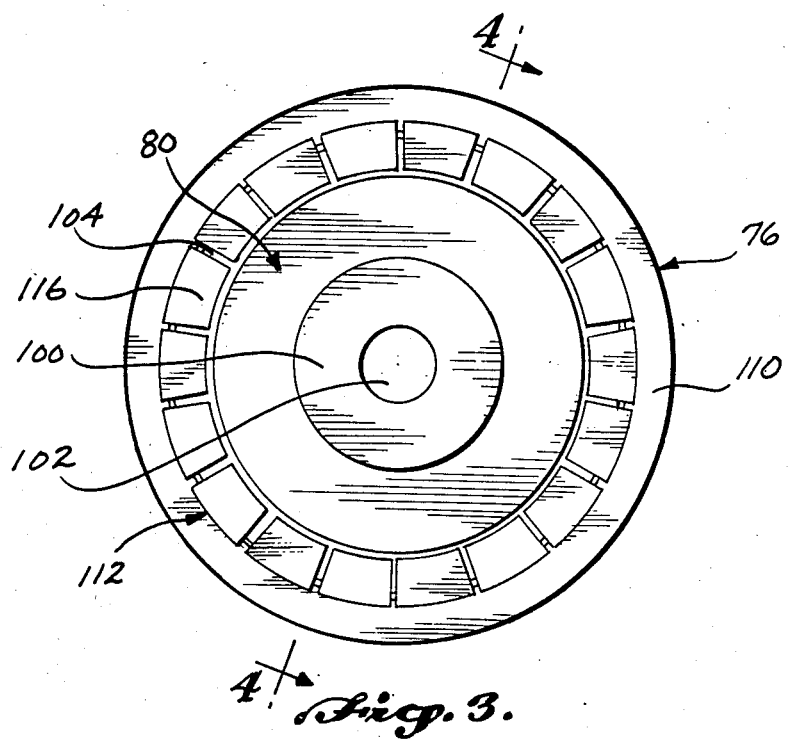
FIG. 3 is a bottom plan view of a coil and a coil mounting system according to the present invention.

The effect of the mounting system shown in FIGS. 3 and 4 is illustrated in FIGS. 5 and 6. As shown in FIG. 5, each beam 114 has a thickness in the radial direction that is much less than the height or width of the beam. Each beam therefore has a compliant axis normal to the plane of the beam, and is comparatively rigid along other axes. Beams 114 are therefore comparatively compliant in the radial direction. To provide sufficient resistance to cross-axis loads, at least three beams should be employed, positioned about the circumference of the coil or coil forms. In the 18-beam embodiment shown in FIG. 3, cross-axis loads are primarily carried by those beams that are nearly parallel to the load axis. For all embodiments, rotational loads are primarily carried by the beams farthest from the rotational axis.

Because base 80 is preferably fabricated from a material identical to that of reed 72, essentially no thermal stresses occur at the reed/base interface at pads 100. However, coil form 76 is typically fabricated from a nonmagnetic metal such as aluminum. The coefficient of thermal expansion of aluminum is much different from that of fused quartz. As a result, temperature change produces a situation such as that shown in FIG. 6, wherein the coil form tends to move radially with respect to the base, as illustrated by arrows 118. As a result of the arrangement shown, such motion is accommodated by beams 114 by radial bending of the beams along their compliant axes. Stresses caused by such differential thermal expansion therefore are not significantly coupled into reed 72, and therefore do not effect the accuracy of the accelerometer. The illustrated coil mounting system possesses the further advantage that it reduces errors due to thermal gradients, such as those caused by resistance heating in the coil at high g levels.

Each beam 114 is preferably oriented such that its compliant axis intersects the centerline of the windings of coil 78. The thick, rigid axis of each beam is oriented tangential to the windings of coil 78. This beam orientation, in combination with the high stiffness of the beams along their longitudinal axes, provides rigid support against translation or rotation of the coil with respect to the reed. Furthermore, the symmetry of beams 114 about coil form 76 insures that there will be no net translational movement of the coil form as the temperature changes. However, in certain applications, it may be desirable to orient beams 114 such that their compliant axes intersect at some point other than the center line of the coil. For example, such an off-center mounting system could be designed to correct for scale factor temperature coefficients. In the illustrated embodiment, beams 114 are formed by slotting. One end of each beam is an integral part of the aluminum coil form, whereas the other end is bonded to fused quartz base 80. In principle, each beam 114 could be formed as a separate piece having a foot 116 adapted for connection to base 80, and an upper end adapted for connection to coil form 110. However, the arrangement shown in FIGS. 3-6 will usually be preferably because it is easier to fabricate and assemble.

Figure 7:
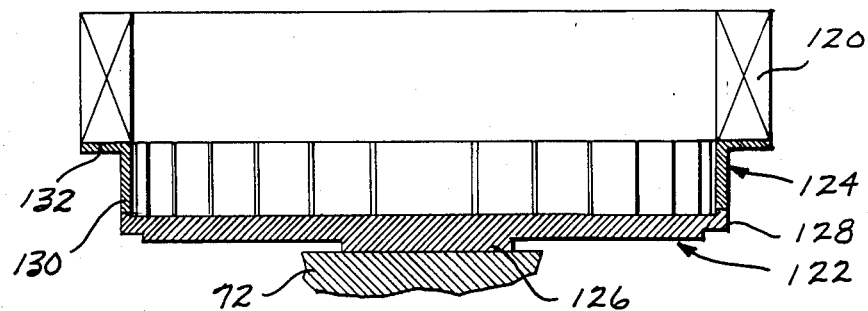
FIG. 7 is a cross-sectional view of a second preferred embodiment of a coil mounting system according to the present invention.
Figure 8:
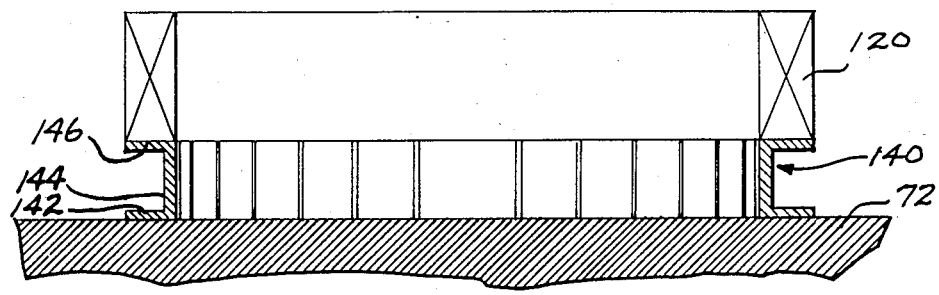
FIG. 8 is a cross-sectional view of a third embodiment of a coil mounting system according to the present invention.
Figure 9:
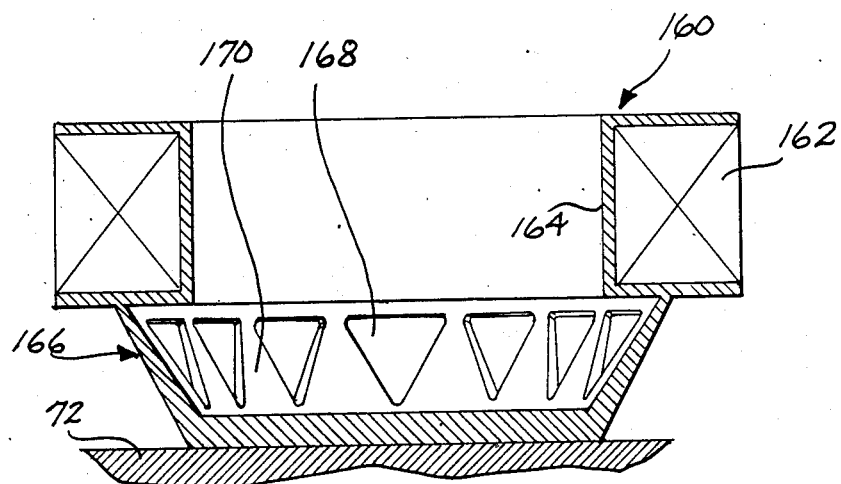
FIG. 9 is a cross-sectional view of a fourth embodiment of a coil mounting system according to the present invention.

Other arrangements of the coil support of the present invention are illustrated in FIGS. 7-9. FIGS. 7 and 8 provide examples of mounting systems for freestanding coil 120, i.e., a coil that is formed into a rigid element that does not require a coil form for support. In FIG. 7, coil 120 is mounted to reed 72 by base 122 and a plurality of inverted L-shaped beams 124. Base 122 is preferably composed of fused quartz or a material having a low coefficient of thermal expansion such as Invar alloy. Preferably, beams 124 are also composed of a substance having a low coefficient of thermal expansion. Base 122 and beams 124 may be formed as a single integral piece, such as fused quartz, or as separate elements, as shown in FIG. 7. In the latter case, the beams may be joined to base 122 by a suitable elastomer. Base 122 includes a comparatively small diameter, centrally located pad 126 at which the base is mounted to pendulum 72 with a suitable elastomer, and a thin outer lip 128 at which the base is mounted to beams 124. Each beam 124 includes a vertically extending beam element 130 that functions in a manner identical to beams 114 of the embodiment of FIGS. 3-6.

In FIG. 8, freestanding coil 120 is mounted to reed 72 by a plurality of three-sided support elements 140. Each support element 140 comprises a base portion 142, a beam element 144 and a support element 146. Each support element may comprise a separate component, or the support elements may be formed by slotting a continuous cylindrical element, as shown in FIG. 8. In the slotted arrangement shown in FIG. 8, base portions 142 are joined together into a continuous annular disk that is mounted directly to reed 72.

FIG. 9 illustrates coil form 160 that is mounted directly to reed 72. Coil form 160 comprises three-sided, annular bracket 164 in which coil 162 is positioned, and a conical mounting structure 166 that connects annular bracket 164 to reed 72. Mounting structure 166 comprises a tapering cylindrical sheet containing triangular cutouts 168 that form tapering beams 170 that function in a manner identical to beams 114 of the embodiment of FIGS. 3-6. The embodiment of FIG. 9 illustrates that the longitudinal axes of the beams need not be parallel to the sensitive axis of the accelerometer or with the cylindrical axes of the coils. It is also not necessary for the beam axes to be oriented solely in the radial direction, i.e., the beam axes need not intersect the center line of the coil.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive pooperty or privilege is claimed are defined as follows:

1. An accelerometer, comprising:
  a proof mass assembly including a reed suspended from a support for movement with respect thereto;
  a coil having a generally cylindrical shape; and
  a mounting system for mounting the coil to the reed, the mounting system comprising at least three mounting means, each mounting means having first and second ends and a resilient intermediate portion, the first end of each mounting means being connected to the coil, the second end of each mounting means being connected to the reed, and the intermediate portion of each mounting means providing a low resistance to relative movement between the coil and reed in a radial direction normal to the coil and a high resistance to relative movement between the coil and reed in directions normal to the radial direction.

2. The accelerometer of claim 1, wherein the reed comprises fused quartz, wherein the mounting system comprises a fused quartz base mounted directly to the reed, and wherein the second end of each mounting means is directly connected to the base.

3. The accelerometer of claim 2, further comprising a coil form on which the coil is mounted, the coil form being directly connected to the first end of each mounting means.

4. The accelerometer of claim 3, wherein the mounting means are formed integrally with the coil form.

5. The accelerometer of claim 2, wherein the base includes a disk-shaped outer lip to which the second end of each mounting means is directly connected.

6. The accelerometer of claim 5, wherein the second end of each mounting means comprises an inwardly extending foot that is secured to the underside of the lip.

7. The accelerometer of claim 2, wherein each mounting means comprises an L-shaped beam comprising connected horizontal and vertical sections oriented at right angles with respect to one another, the horizontal section comprising the first end, a distal portion of the vertical section comprising the second end, and the vertical section itself comprising the intermediate portion.

8. The accelerometer of claim 1, wherein each mounting means comprises a C-shaped beam having a pair of horizontally extending sections comprising the respective first and second ends interconnected by a vertically extending section comprising the intermediate portion.

9. The accelerometer of claim 1, wherein the mounting system comprises a tapering cylindrical sheet containing triangular cut out portions that form tapering beams, the tapering beams comprising the intermediate portions of the mounting means.

* * * * *